(12) United States Patent
Ellwood et al.

(10) Patent No.: US 8,020,597 B2
(45) Date of Patent: Sep. 20, 2011

(54) OXIDATION SHIELD FOR TIRES

(75) Inventors: Kevin Ellwood, Ann Arbor, MI (US);
John Baldwin, Bloomfield Hills, MI (US); David Bauer, Livonia, MI (US);
David Rohweder, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1090 days.

(21) Appl. No.: 11/443,311

(22) Filed: May 31, 2006

(65) Prior Publication Data

US 2007/0277918 A1 Dec. 6, 2007

(51) Int. Cl.
*B60C 5/00* (2006.01)
*B60C 5/12* (2006.01)
*B60C 5/14* (2006.01)
*B60C 15/00* (2006.01)

(52) U.S. Cl. ......... 152/510; 152/450; 152/539; 152/555
(58) Field of Classification Search .................. 152/555, 152/450, 510, 539
See application file for complete search history.

(56) References Cited

U.S. PATENT DOCUMENTS

| | | | |
|---|---|---|---|
| 5,036,113 A | 7/1991 | Boon et al. | |
| 6,675,851 B1 | 1/2004 | Masson et al. | |
| 6,698,483 B2 | 3/2004 | Pagano et al. | |
| 7,407,999 B2 * | 8/2008 | Tsou et al. | 524/445 |
| 2002/0156202 A1 | 10/2002 | Pagano et al. | |
| 2004/0084123 A1 | 5/2004 | Pagano et al. | |
| 2004/0194863 A1 | 10/2004 | Grah | |

FOREIGN PATENT DOCUMENTS

| | | | |
|---|---|---|---|
| JP | 9-19987 | * | 1/1997 |
| WO | WO-99-24502 | | 5/1999 |

OTHER PUBLICATIONS

K. Murakami et al. (1979). "Chemorheology of Polymers," *in Polymer Science Library 1*, Elsevier Scientific Publishing Company, Amsterdam-Oxford-New York, pp. 1-216.
K. Gillen et al. (1989). "Time-Temperature-Dose Rate Superposition: a Methodology for Extrapolating Accelerated Radiation Aging Data to Low Dose Rate Conditions," *Polymer Degradation and Stability* 24: 137-168.
K. Gillen et al. (1992). "Rigorous Experimental Confirmation of a Theoretical Model for Diffuson-Limited Oxidation," *POLYMER* 33 (20): 4358-4365.
K. Gillen et al. (1995). "General Solution for the Basic Autoxidation Scheme," *Polymer Degradation and Stability* 47: 149-161.
K. Ellwood et al. (2004). "A Finite-Element Based Model for Ageing Tires in Ovens," located at http://www.rlis.ford.com/techreports/index.html, *Ford Research and Advanced Engineering Technical Reports (SRR-2004-0158)* (Project No. AJ44C), Ford Proprietary, Ford Motor Company, pp. 1-32.
J. Baldwin et al (2004), "Accelerated Aging of Tires, Part III," *Rubber Chemistry and Technology* 78: 767-776.

(Continued)

*Primary Examiner* — Justin Fischer
(74) *Attorney, Agent, or Firm* — O'Brien Jones, PLLC

(57) ABSTRACT

The invention is directed to increasing the endurance of a tire by providing an oxidation shield strip located in the vicinity of a critical area of the tire. The oxidation shield strip acts as a local oxygen diffusion barrier.

15 Claims, 7 Drawing Sheets

OTHER PUBLICATIONS

K. Ellwood et al. (2005). "A Finite Element Model for Oven Aged Tires²," *Tire Science and Technology* 33(2): 103-119.

K. Ellwood et al. (2005). "A Model for the Thermal Oxidation of Automotive Tires," located at http://www.rlis.ford.com/techreports/index.html, *Ford Research and Advanced Engineering Technical Reports (SRR-2005-0078) (Project Number: AJ44C)*, Ford Proprietary, Ford Motor Company, pp. 1-33.

D. Bauer et al (2005). "Correlation of Rubber Properties Between Field Aged Tires and Laboratory Aged Tires," *Rubber Chemistry and Technology* 78: 777-792.

\* cited by examiner

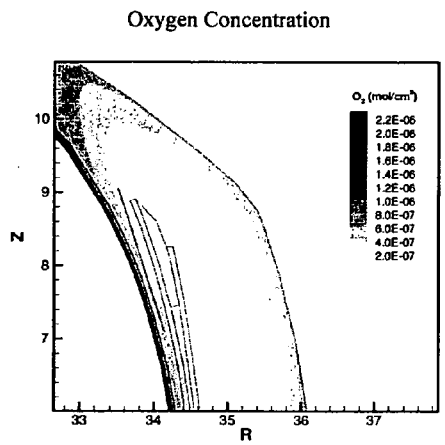

SIMULATION FOR THERMAL OXIDATION OF A P235 75R15 TIRE ROLLING AT 40mph WITH A 1500lb LOAD AND 35psi INFLATION PRESSURE. SHOWN ARE RESULTS FOR STEADY STATE OXYGEN PROFILES WITHOUT AN OXIDATION SHIELD STRIP IN THE WEDGE REGION.

FIG. 3A

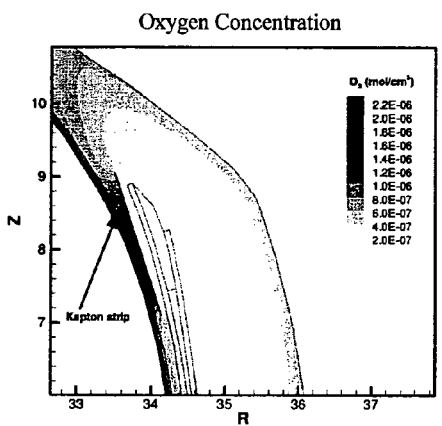

SIMULATION FOR THERMAL OXIDATION OF A P235 75R15 TIRE ROLLING AT 40mph WITH A 1500lb LOAD AND 35psi INFLATION PRESSURE. SHOWN ARE RESULTS FOR STEADY STATE OXYGEN PROFILES WITH AN OXIDATION SHIELD STRIP IN THE WEDGE REGION.

FIG. 3B

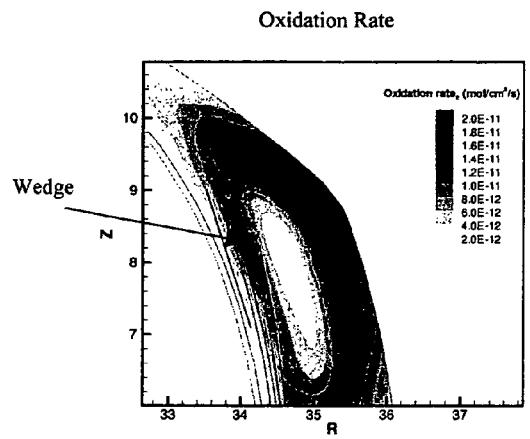

SIMULATION FOR THERMAL OXIDATION OF A P235 75R15 TIRE ROLLING AT 40mph WITH A 1500lb LOAD AND 35psi INFLATION PRESSURE. SHOWN ARE RESULTS FOR OXIDATION RATES WITHOUT AN OXIDATION SHIELD STRIP IN THE WEDGE REGION.

*FIG. 3C*

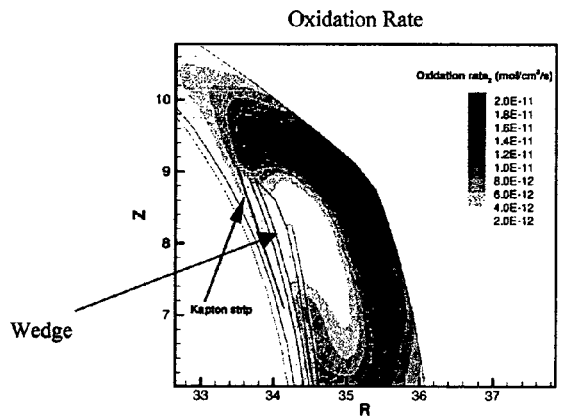

SIMULATION FOR THERMAL OXIDATION OF A P235 75R15 TIRE ROLLING AT 40mph WITH A 1500lb LOAD AND 35psi INFLATION PRESSURE. SHOWN ARE RESULTS FOR OXIDATION RATES WITH AN OXIDATION SHIELD STRIP IN THE WEDGE REGION.

*FIG. 3D*

MEAN VARIATION IN OXIDATION RATE FOR THE ENTIRE
WEDGE REGION VERSUS WEDGE GUARD WIDTH L

MEAN VARIATION IN OXIDATION RATE FOR THE
ENTIRE WEDGE REGION VERSUS WEDGE GUARD
DIFFUSION COEFFICIENT D

OXIDATION SHIELD FOR TIRES

FIELD OF INVENTION

This invention relates to the field of increasing tire endurance by reducing oxidative aging in tires. More specifically, this invention relates to reducing oxidative aging in tires using diffusion barriers or oxygen shields in the vicinity of critical areas of the tires.

BACKGROUND

One concern for tire manufacturers is increasing the endurance of tires. Elastomers such as the rubber compositions commonly used in tires can age through oxidation, resulting in dramatic spatial variations in mechanical properties. These variations can cause a component to fail to meet design requirements or, in the worst case, to fail mechanically. Understanding oxidation involves characterization of chemical kinetics, species transport by diffusion, and the physical environment to which a rubber composition is exposed. These factors demonstrate the impact of component design on the oxidation process and are important for predicting a product's usable life.

It is beneficial to increase tire endurance by limiting oxidation of the tire's rubber composition. Because a substantial portion of the oxygen available to oxidize the rubber is supplied by the tire's inflation air, a known way of increasing tire endurance by reducing oxidation includes using a less permeable layer, such as a butyl rubber layer, against the inner walls of tires (see FIG. 1). Butyl rubber, however, is not completely oxygen-impermeable and therefore allows a limited amount of oxidation to occur throughout the tire and within critical areas of the tire.

Another known method for avoiding oxidation involves chemically trapping oxygen by accelerated thermo-oxidation of a rubber composition that acts as a buffer and is arranged between an oxygen source and a zone for which oxidation protection is desired. It is known to place such a composition between the inner face of the tire and the carcass ply to reduce the quantity of oxygen that comes into contact with the carcass ply from inflation air. Exposure to inflation air is a concern due to its high pressure. Using such a composition, however, has disadvantages including increased rolling resistance.

Another known method of reducing oxidation includes tire covers that protect the tire from atmospheric air. This method is obviously not practical for protecting tires in use and does not protect the tire from inflation air.

Typical tire construction, as shown in FIG. 1, is designed to meet various mechanical requirements depending on the specific application. However, consideration must also be given to how tire construction can impact durability, for which oxidation is a critical factor. The amount of oxygen transported through a tire is determined to a great extent by the butyl layer, or halobutyl inner liner, which essentially functions as an oxygen barrier due to its low oxygen diffusivity compared to the rubber composition that comprises the bulk of the tire.

An important component in the construction of tires is the wedge, which acts as an energy absorber. In a typical steel belted radial tire construction, the wedge rubber is inserted between two steel belt plies at an area of relatively high strain, usually toward the belt edges. The wedge rubber in a steel belted radial tire is added to help prevent belt edge separation (BES), which can increase tire durability. Other tire components affecting tire durability include, but are not limited to, the apex and the side wall.

BRIEF SUMMARY OF THE INVENTION

In one embodiment, the invention is directed to a tire having increased endurance. The tire comprises at least one oxidation shield strip located in the vicinity of a critical area of the tire. The oxidation shield strip acts as a local oxygen diffusion barrier.

In another embodiment, the invention is directed to an oxidation shield strip for increasing endurance of a tire comprising a rubber composition. The oxidation shield strip is provided in a critical area of the tire to limit oxidation of the rubber composition in the vicinity of the critical area.

In yet another embodiment, the invention is directed to a method of increasing the endurance of a tire having a rubber composition. The method comprises providing an oxidation shield strip in a critical area of the tire to limit oxidation of the rubber composition.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

FIGS. 3A-3D are photo spectrographs illustrating exemplary simulations for thermal oxidation of a tire, including results for steady state oxygen profiles and oxidation rates with and without an oxidation shield strip of the present invention being provided in a wedge region of the tire.

DETAILED DESCRIPTION OF THE INVENTION

To mitigate oxidative aging, the present invention increases durability of a tire by inserting one or more strips of material in the vicinity of critical areas acting as a local diffusion barrier or shield to oxygen. These strips are referred to herein as oxidation shield strips. These strips can reduce the overall oxidative aging process in critical areas of the tire by (1) reducing the molecular oxygen flux (rate of oxygen transport) to the region of interest, and (2) reducing the molecular oxygen concentration due to the reduced flux. This would desirably reduce the chemical kinetic rate because less oxygen is available to react. Examples of critical areas that could benefit from local oxidation protection include, but are not limited to, the tire wedge, the tire apex, and the lower, mid, and upper side walls.

Figure 1:
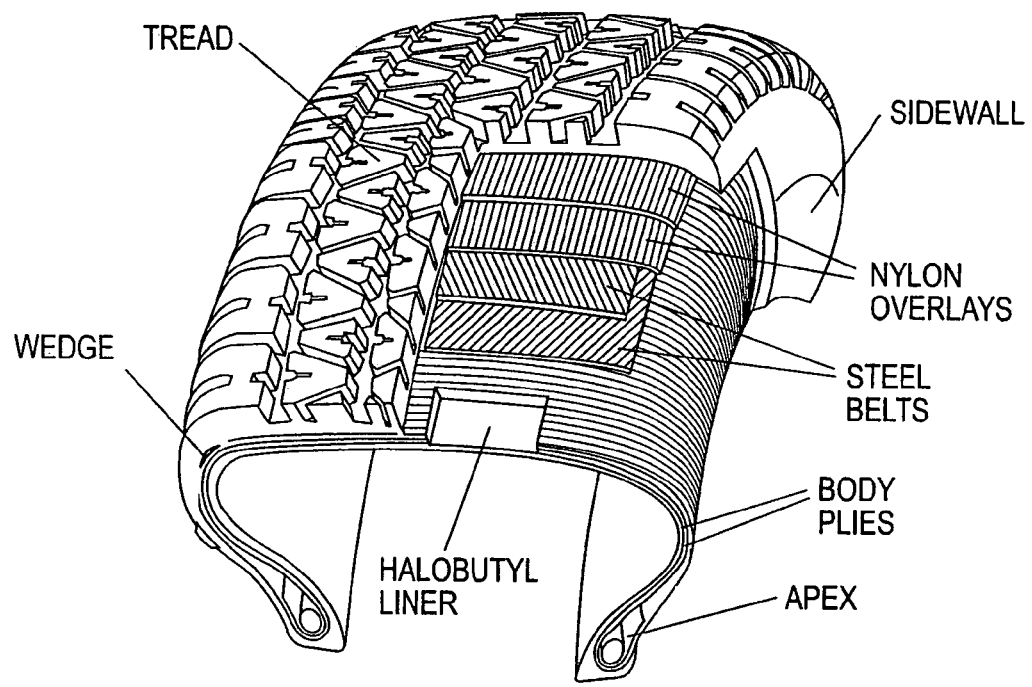
FIG. 1 is a cross-sectional view of a prior art belted tire, such as a steel belted radial tire.
Figure 2:
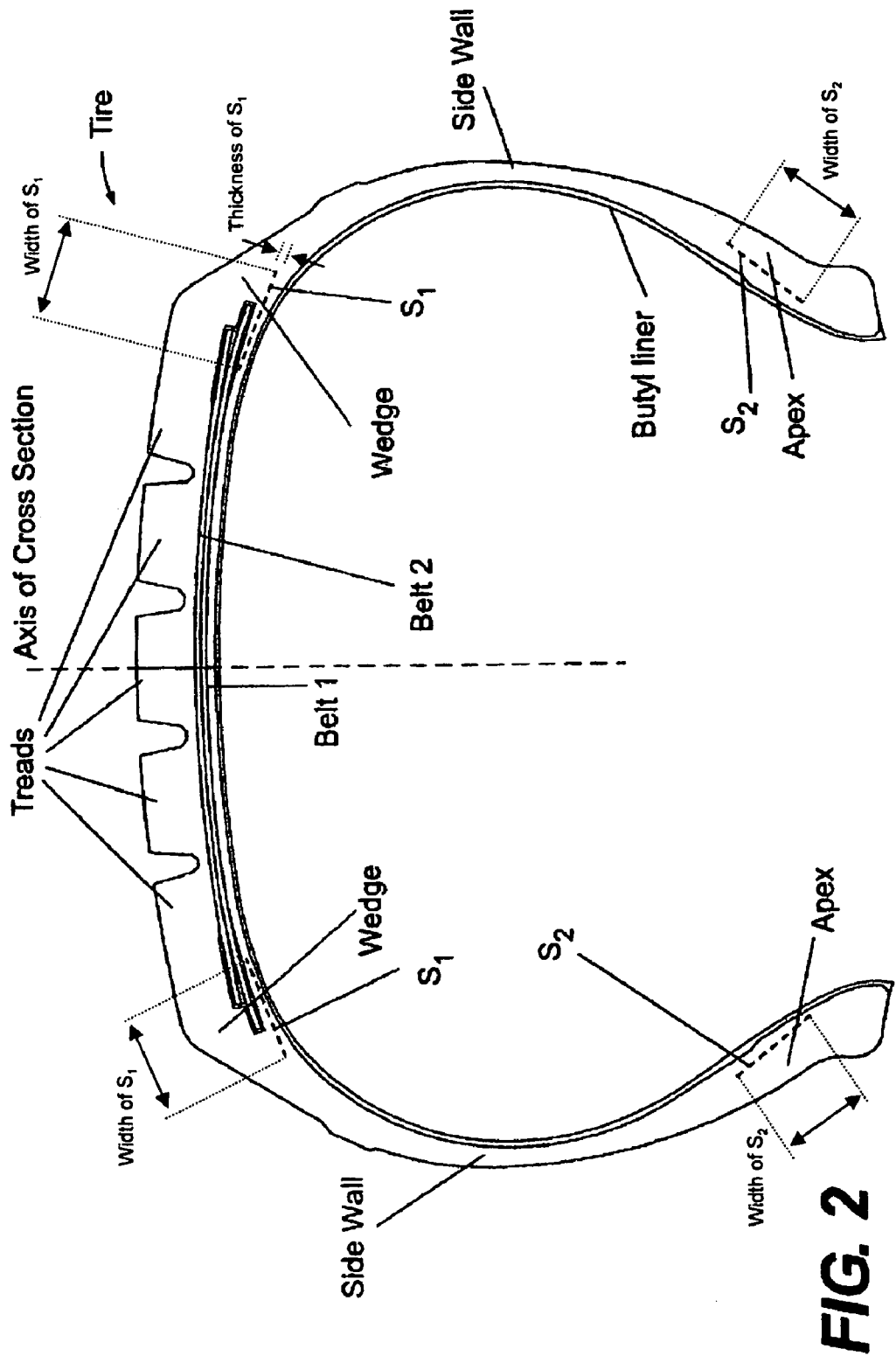
FIG. 2 is a cross-sectional view of a steel belted radial tire illustrating oxidation shield strips in accordance with embodiments of the invention.
Figure 4A:
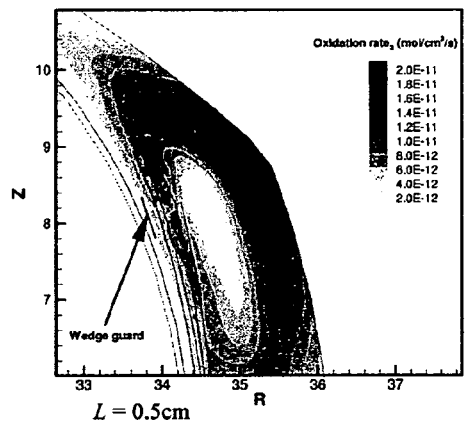
FIG. 4A-4D show the effect on oxidation rate of changing the width, L, of an oxidation shield strip used as an oxidation barrier, using Kapton® material properties.
Figure 4B:
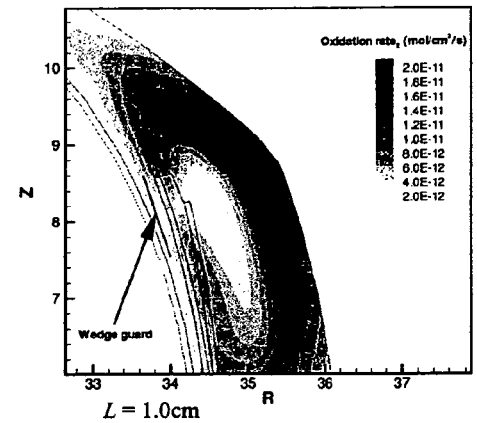
Figure 4C:
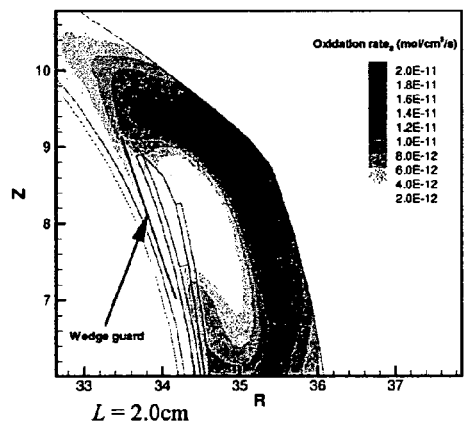
Figure 4D:
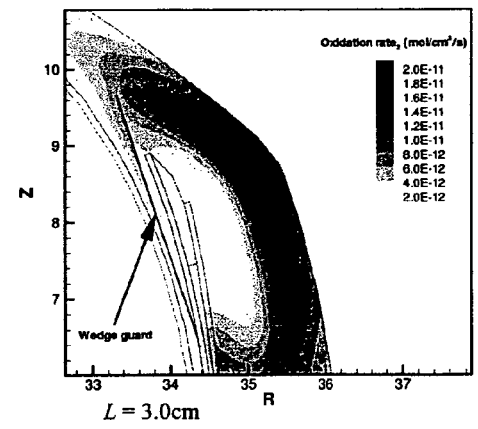

FIG. 2 illustrates exemplary embodiments of the present invention. A cross section of an exemplary tire having treads and belts is shown. To simplify the drawing, the body plies from FIG. 1 have been omitted, with the understanding that at least one body ply is preferably present between the butyl liner and the belt(s). The tread increases tire traction and the belts help prevent puncturing of the tire. A sidewall extends from each side of the treads. The tire is also shown to have a butyl liner which, as stated above, is provided at the inner wall of the tire to reduce oxidation caused by inflation air. The wedges of the tire are located in between and adjacent to the edges of the belts. They act as energy absorbers and help prevent belt edge separation (BES). The apexes of the tire are located at distal ends of the side walls. As can be seen, at least one strip $S_1$ of material acting as an oxidative shield (due to reduced oxygen permeability), can be provided in the vicinity of the wedge, preferably on each side of the tire. The strips $S_1$ are preferably provided to be symmetrical about the axis of the cross section of the tire. The present invention contemplates providing any number of strips in the vicinity of the wedge. Like the butyl layer, the oxidation shield strips $S_1$ reduce oxidation caused by inflation air, but do so in a localized manner in the vicinity of a critical area of the tire.

Alternatively or in addition, at least one strip $S_2$, can be provided in the vicinity of the tire's apex to locally reduce oxidation caused by inflation air. The strips $S_2$ are preferably provided to be symmetrical about the axis of the cross section of the tire. The present invention contemplates providing any number of strips in the vicinity of the apex.

The present invention also contemplates providing strips in other areas of the tire that would enhance tire durability, such as within the side walls of the tire.

The present invention contemplates oxidation shield strips having varying widths and thicknesses, depending on the diffusivity of the material being used, along with other factors such as cost and overall tire performance. The strip may, for example, comprise Kapton® and have a width of a few centimeters and a thickness of less than a millimeter. The present invention contemplates that a strip has a width that is preferably less than would extend through both the tread and side walls of the tire and is capable of providing localized results.

The oxidation shield strips $S_1$ and $S_2$ are preferably provided within the layers of the tire, but may also be placed along the inner wall of the tire to reinforce the butyl layer. In a particularly preferred embodiment, the oxidation shield strips $S_1$ and $S_2$ are provided between the butyl layer and the belts.

Each oxidation shield strip preferably has, as one of its properties, a low permeation rate (or diffusion coefficient D) for oxygen. With such a property and placement as described, the overall oxidative durability of a tire can be greatly improved.

To support the oxidative shielding concept for an oxidation shield strip placed in the region of the tire wedge, a tire oxidative aging model was used to simulate the steady state oxidative profile for a tire rolling at 40 mph with loading of 1500 pounds and an inflation pressure of 35 psi. The test tire geometry used was a Michelin P235/75 R15. The results are shown in FIGS. 3A through 3D, with oxygen content on the left and oxidation rate on the right. FIGS. 3A and 3B show results without an oxidation shield in the area of the wedge and FIGS. 3C and 3D show results when an oxidation shield is placed in the area of the wedge. The material selected for the oxidation shield strip in the simulation was a two centimeter wide strip of 0.1 millimeter thick Kapton® film (a polymer film), but the present invention contemplates oxidation shield strips comprising a variety of materials with low permeation rates, such as other polymer films, including nylon and polyester films. The shield may also comprise a combination of the above-listed materials. The present invention also contemplates the strip comprising a woven or non-woven material, as long as the overall permeability of the oxidation shield remained suitably low. The woven or non-woven material may be used in addition to or instead of a film.

As can be seen in FIGS. 3A-3D, simulation results show that oxygen concentration drops in the tread region close to the wedge, which is a result of limited replenishing of oxygen that is consumed in the oxidation process in the thick region of the tire. At a location near the center of the wedge, the simulation test results show that the molecular oxygen concentration was reduced from 68.4e-9 mole/cm$^3$ to 9.92e-9 mole/cm$^3$, and the oxidation rate was reduced from 11.6e-12 mole/cm$^3$/s to 2.41e-12 mole/cm$^3$/s. The latter constitutes a reduction by a factor of five in the rate of oxidation in the wedge region, which implies a reduction in oxidative aging by the same factor.

FIGS. 4A-4D show the effect on oxidation rate of changing the width, L, of an oxidation shield strip used as an oxidation barrier, again using Kapton® material properties. It should be noted that there is a maximum oxidation rate close to the outside of the tire. This location coincides with the maximum temperature developed during driving conditions, but is offset toward the outside edge of the tire. The higher temperatures result in higher kinetic rates to cause the maximum oxidation rate, but also increase the oxygen diffusion coefficient in the tire's natural rubber, causing the shift in location of the maximum oxidation rate. It should also be noted that the lighter regions of the contours, representing lower oxidation rates, slowly engulf the wedge region as the insert width is increased from 0.5 centimeters to three centimeters. This indicates that the increased protection of the wedge from the transport of oxygen from within the tire results in a lower oxidation rate.

Figure 5:
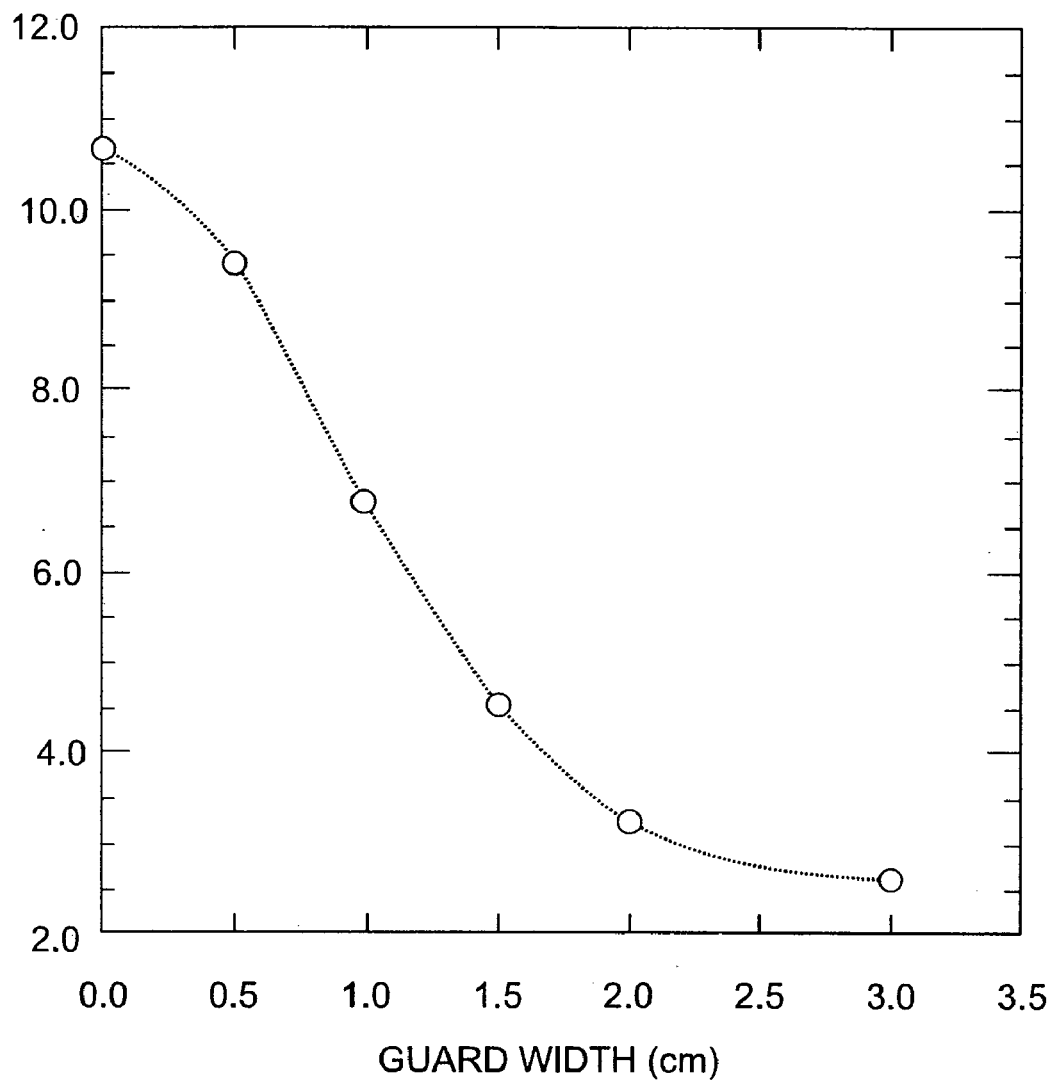
FIG. 5 is an exemplary plot of the mean oxidation rate in the wedge region versus the width, L of an oxidation shield strip.

The effect is shown more clearly in FIG. 5, which is an exemplary plot of the mean oxidation rate in the wedge region versus the width of the insert strip. FIG. 5 clearly shows a reduction in the benefit of increasing the strip width beyond two centimeters with an inflection occurring near one centimeter. The inflection represents the maximum change in benefit for a given width, indicating that one centimeter is the preferred minimum strip width used given the assumed film thickness and properties. The results, of course, will likely vary depending on the characteristics (e.g., the diffusivity and thickness) of the strip material.

Figure 6:
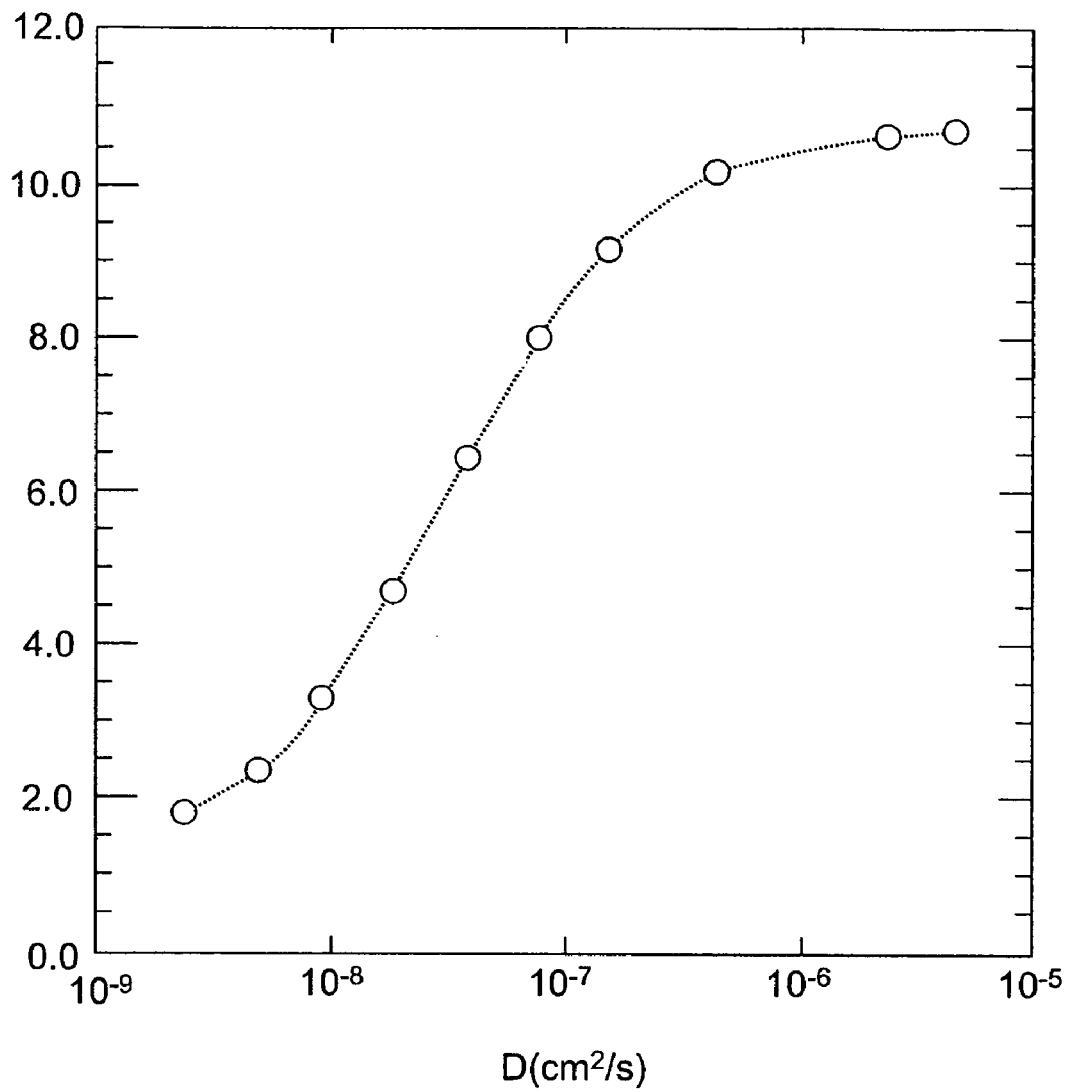
FIG. 6 illustrates exemplary simulation results for oxidation shield strips, of varying diffusion coefficients, being placed in the wedge region of a tire.

FIG. 6 illustrates the change in the mean oxidation rate for a tire's wedge region, given oxidative shielding having a variety of diffusion coefficients D. Thus, FIG. 6 shows that a wide range of materials may be selected for use as an oxidative shield, allowing flexibility in mechanical properties for the oxidation shield, economy, and shielding effect. The highest value used for the test simulation was $4.5 \times 10^{-6}$ cm$^2$/s, which is the diffusivity of a tire's rubber composition, and therefore the equivalent of having no oxidation shield. It should be noted that the mean oxidation rate increases with increasing diffusivity values, having an approximate exponential behavior with plateaus at the two extremes.

The embodiments of the invention set forth above are exemplary only. One skilled in the art would understand that the invention as claimed below can encompass known variations of the above embodiments and remain within the scope of the claims. For example, oxidation shield strips can be provided throughout the tire, to act locally within the wedge, the apex, and the side walls. The tire construction need not be steel belted as shown. The oxidation shield strip would also work well in the critical areas of most other types of tires, including but not limited to bias ply and bias belted tires.

What is claimed is:

1. A tire having increased endurance, comprising:
at least one oxidation shield strip located in the vicinity of at least one of a wedge and an apex of the tire, wherein the oxidation shield strip comprises a polymer film strip having a width of from about one centimeter to about two centimeters.

2. The tire of claim 1, comprising two oxidation shield strips.

3. The tire of claim 2, wherein the tire includes more than one critical area, and the oxidation shield strips are located in the vicinity of different critical areas.

4. The tire of claim 1, wherein the oxidation shield strip has a thickness of less than about one millimeter.

5. The tire of claim 1, wherein the oxidation shield strip comprises a nylon or polyester film.

6. The tire of claim 1, wherein the oxidation shield strip comprises Kapton®.

7. An oxidation shield strip for increasing endurance of a tire comprising a rubber composition, the oxidation shield strip being provided in a critical area of the tire and comprising a polymer film strip having a width of from about one centimeter to about two centimeters and a thickness of less than about one millimeter.

8. The oxidation shield strip of claim 7, wherein the oxidation shield strip is provided in the vicinity of a wedge region of the tire.

9. The oxidation shield strip of claim 7, wherein the oxidation shield strip is provided in the vicinity of an apex of the tire.

10. The tire of claim 7, wherein the oxidation shield strip comprises a nylon or polyester film.

11. The tire of claim 7, wherein the oxidation shield strip comprises Kapton®.

12. A method of increasing the endurance of a tire having a rubber composition, the method comprising:
providing an oxidation shield strip in at least one of a wedge and an apex of the tire, wherein the oxidation shield strip comprises a polymer film strip having a width of from about one centimeter to about two centimeters.

13. The tire of claim 12, wherein the oxidation shield strip has a thickness of less than about one millimeter.

14. The tire of claim 12, wherein the oxidation shield strip comprises a nylon or polyester film.

15. The tire of claim 12, wherein the oxidation shield strip comprises Kapton®.

* * * * *